(12) United States Patent
Foster et al.

(10) Patent No.: US 12,071,066 B2
(45) Date of Patent: Aug. 27, 2024

(54) BRACKET ASSEMBLY FOR A LIGHT

(71) Applicant: Belmor, Inc., Ann Arbor, MI (US)

(72) Inventors: Josh Foster, Ann Arbor, MI (US); Terrel Lindsay, Ann Arbor, MI (US)

(73) Assignee: BELMOR, INC., Ann Arbor, MI (US)

( * ) Notice: Subject to any disclaimer, the term of this patent is extended or adjusted under 35 U.S.C. 154(b) by 0 days.

(21) Appl. No.: 17/940,337

(22) Filed: Sep. 8, 2022

(65) Prior Publication Data

US 2024/0083339 A1     Mar. 14, 2024

(51) Int. Cl.
*B60Q 1/00*     (2006.01)

(52) U.S. Cl.
CPC .................................. *B60Q 1/0035* (2013.01)

(58) Field of Classification Search
CPC .................................................... B60Q 1/0035
See application file for complete search history.

(56) References Cited

U.S. PATENT DOCUMENTS

| 6,220,737 | B1 * | 4/2001 | Baragona | ............. | B60Q 1/0483 |
| | | | | | 362/540 |
| 2014/0197218 | A1 * | 7/2014 | Jordan | ..................... | B60Q 1/18 |
| | | | | | 224/545 |
| 2016/0327247 | A1 * | 11/2016 | Leang | .................. | B60Q 1/2611 |
| 2022/0185184 | A1 * | 6/2022 | Clarke | .................. | F16B 11/006 |
| 2023/0014250 | A1 * | 1/2023 | Steinkellner | .......... | G01J 1/0271 |
| 2023/0070384 | A1 * | 3/2023 | Groce | ...................... | H04N 5/77 |
| 2023/0160521 | A1 * | 5/2023 | Peng | ....................... | F16M 11/04 |
| | | | | | 248/560 |

OTHER PUBLICATIONS

United Truck Center, https://www.uatparts.com/17-led-watermelon-double-face-light-amber-red-led-clear-lens/, last accessed on Aug. 18, 2022.

Trux Accessories, https://truxaccessories.com/led-lighting/standard-leds/fender-leds/clear-amber-clear-red-turn-signal-marker-square-double-face-led-fender-light-38-diodes, last accessed on Aug. 18, 2022.

\* cited by examiner

*Primary Examiner* — Christopher E Dunay
(74) *Attorney, Agent, or Firm* — The Dobrusin Law Firm, P.C.

(57) ABSTRACT

The present disclosure relates to a bracket assembly for a light. The light is mountable on a vehicle with the bracket assembly. The bracket assembly comprises a main body comprising a post, and an adapter body comprising a post. The adapter body is engageable to the main body. The main body or the adapter body comprises an additional post.

20 Claims, 4 Drawing Sheets

BRACKET ASSEMBLY FOR A LIGHT

FIELD

The present disclosure provides for a bracket assembly. The bracket assembly receives a light. The bracket assembly affixes to a vehicle.

BACKGROUND

Vehicles are typically provided with lights by OEMs. Such lights are affixed to the vehicle by fastener holes fabricated into the bodywork and/or framing of the vehicle. The quantity, size, and placement of the fastener holes can vary from vehicle to vehicle. Typically, either one or two fastener holes are fabricated into the vehicle.

Vehicle owners may replace lights provided by an OEM with aftermarket products. Such products can be constructed to cooperate with already-present fastener holes. However, in some circumstances, the desired light may not fit with the already-present fastener holes. By way of example, an aftermarket product may have two posts to be received by the vehicle, but the vehicle may have only one fastener hole. Thus, in order to fit the aftermarket product to the vehicle, another fastener hole must be formed. By way of another example, an aftermarket product may have one post to be received by the vehicle, but the vehicle may have two fastener holes. Thus, one fastener hole may be unoccupied and/or exposed.

It would be desirable to provide a bracket assembly, where the bracket assembly can be configured to different arrangements of fastener holes.

It would be desirable to provide a bracket assembly that can readily be reconfigured to cooperate with existing fastener holes on a vehicle without the need to fabricate new fastener holes.

It would be desirable to provide a bracket assembly that can occupy existing fastener holes such that the existing fastener holes are not visually exposed.

It would be desirable to provide a bracket assembly for a light operable with a vehicle.

SUMMARY

The present disclosure provides for a bracket assembly that may address at least some of the needs identified above. The bracket assembly may be for a light. The bracket assembly may be mountable on a vehicle.

The bracket assembly may comprise a main body and an adapter body. The main body may comprise a post. The adapter body may comprise a post. The bracket assembly may be engageable to the main body. The main body or the adapter body may comprise an additional post.

The adapter body may comprise an adapter hole. The adapter hole may receive the post of the main body and/or align with a post hole of the main body in which a portion of the post of the main body resides.

The adapter body may comprise an additional adapter hole. The additional adapter hole may receive the additional post of the main body and/or aligns with an additional post hole of the main body in which a portion of the additional post of the main body resides.

The post of the main body and/or the additional post of the main body may be integrally formed to the main body. The post of the main body and/or the additional post of the main body may be respectively accepted by the adapter hole and/or the additional adapter hole.

The post of the main body and/or the additional post of the main body may be removable from the main body. The post hole of the main body and/or the additional post hole of the main body, with the post and/or the additional post removed, respectively may align with the adapter hole and/or the additional adapter hole.

The bracket assembly may comprise a first fastener. The first fastener may extend through the adapter hole and the post hole of the main body. The bracket assembly may comprise a second fastener. The second fastener may extend through the additional adapter hole and the additional post hole of the main body.

The post of the main body and/or the additional post of the main body may be threaded at least on the portions that are received by the post hole and/or the additional post hole.

The post hole and/or the additional post hole of the main body may be threaded correspondingly to the threading of the post of the main body and/or the threading of the additional post of the main body, respectively.

The adapter body may comprise a post hole and an additional post hole in which a portion of the post of the adapter body and a portion of the additional post of the adapter body respectively reside. The post hole of the adapter body and the additional post hole of the adapter body may be located on an opposing side of the adapter body from the adapter hole.

The adapter body may comprise a post hole in which a portion of the post of the adapter body resides. The post hole may be located on an opposing side of the adapter body from the adapter hole.

The main body may engage a light.

The main body may comprise a clamp ring. The clamp ring may extend at least partially around the light.

The clamp ring may comprise a first portion and a second portion movable with respect to the first portion.

The first portion may be integrally formed to the main body.

The first portion and the second portion may be connectable by one or more fasteners.

The post of the main body and the post of the adapter body may extend through a body component of a vehicle.

The main body and the adapter body may each comprise a wiring through-hole. The wiring through-hole of the main body may be coaxial with the wiring through-hole of the adapter body.

The wiring through-hole of the adapter body may cooperate with the post of the adapter body to provide for the passage of one or more wires The post of the adapter body may be tubular.

The present disclosure provides for a bracket assembly that may address at least some of the needs identified above. The bracket assembly may be for a light. The bracket assembly may be mountable on a vehicle.

The bracket assembly may comprise a main body and an adapter body.

The main body may comprise a first post and a second post.

The adapter body may be engageable to the main body. The adapter body may comprise a post, a first adapter hole, a second adapter hole, and a post hole. The first adapter hole may receive the first post of the main body and/or align with a first post hole of the main body in which a portion of the first post of the main body resides. The second adapter hole may receive the second post of the main body and/or align with a second post hole of the main body in which a portion of the second post of the main body resides. The post of the adapter body may reside in the post hole of the adapter body.

The post hole of the adapter body may be located on an opposing side of the adapter body from the adapter hole.

The post of the main body and/or the additional post of the main body may be removable from the main body.

The post hole of the main body and/or the additional post hole of the main body, with the post and/or the additional post removed, may respectively align with the adapter hole and/or the additional adapter hole.

The bracket assembly may comprise a first fastener and/or a second fastener. The first fastener may extend through the adapter hole and the post hole of the main body. The second fastener may extend through the additional adapter hole and the additional post hole of the main body.

DESCRIPTION

The present disclosure provides for a bracket assembly. The bracket assembly may function to engage one or more lights, fasten to a vehicle, or both. The light may be a watermelon light, although any style of light may be employed with the present bracket assembly. The light may be single-faced or two-faced. The single-faced light may direct light in one direction. The dual-faced light may direct light in two directions. The two directions may be opposing directions.

The vehicle may be any vehicle suitable for receiving the bracket assembly. The vehicle may include a sedan, mid-size sport utility vehicle, a sport utility vehicle, a van, a pickup truck, a semi-truck, a recreational vehicle, or the like.

The bracket assembly may fasten to a body a body component of a vehicle. The bracket assembly may be fastened to any suitable body component. The bracket assembly may include a fender, a roof, a quarter panel, a pillar, a bumper, a door, a trunk, or the like.

The body component may comprise one or more fastener holes with which the bracket assembly may fasten. The bracket assembly may be applied to a first side of the body component and fasteners may extend up from a second side of the body component and engage with the bracket assembly. In some aspects, a fastener such as a bolt may extend up through the second side of the body component and the head of the fastener bolt may engage the second side while a threaded portion of the fastener may engage the main body or adapter body. In some aspects, a threaded fastener may extend down from the first side of the body component and another fastener such as a nut may engage the threaded fastener. Any suitable type of fastener may be employed as will be appreciated from the present teachings.

The main body with or without the adapter body may be installed on a vehicle. Whether or not the adapter body is employed may depend on the quantity, size, and/or placement of the fastener holes fabricated into the vehicle body component.

The bracket assembly may comprise a main body and/or an adapter body. The main body and the adapter body may comprise at least one post. The main body may comprise a greater quantity of posts that the adapter body, or vice versa. That is, either the main body or the adapter body may comprise one or more additional posts relative to the other body.

Typically, body components of vehicles (e.g., fenders) are provided with one or two fastener holes, although any number of fastener holes are contemplated by the present teachings. The adapter body may be commercially provided as different models with various quantities, sizes, and/or placements of posts. In this regard, the adapter body may be chosen to fit a particular vehicle make, model, model year, and/or trim level in the event that the main body does not have a corresponding quantity, size, and/or placement of posts to the fastener holes of the body components.

The main body, being engageable with a light, may be employed on a vehicle with or without the adapter body. Where a vehicle owned by a consumer has a different quantity, size, and/or placement of holes formed in body components, relative to the main body, an adapter body may be employed. Where the vehicle owned by a consumer has a corresponding quantity, size, and/or placement of holes formed in body components, relative to the main body, the main body may be employed without the adapter body.

The adapter body may be engageable to the main body. The adapter body may fasten to the main body.

The adapter body may receive one or more posts of the main body.

One or more posts of the main body may be removable from the main body to expose one or more post holes of the main body. One or more fasteners may extend through both the adapter body and the post holes of the main body.

The main body and/or the adapter body may comprise one or more post holes. The post holes may function to receive posts, fasteners, or both. The posts may or may not be removable from the post holes. The posts, once received by the post holes, may be fastened to the main body and/or the adapter body. The posts may be fastened by threading, a chemical fastener, a detent, a twist-lock mechanism, press-fitting, set screwing, the like, or any combination thereof.

A first portion of the posts may be received by the post holes and a second portion of the posts may extend from the main body. The second portion may be exposed. At least a portion of the posts may be threaded. The post holes may be threaded in corresponding manner to the posts. The threading may be located corresponding to the dimensions of the post holes and/or the dimensions of the adapter holes. One or more first portions may be threaded and one or more second portions may be free of threading. The posts may be fastened to the main body.

The present disclosure contemplates that the posts may be integrally formed to the main body, in which case the main body may be free of post holes. The posts may be integrally cast or welded, in the case of metal fabrication, with the main body. The posts may be integrally molded or welded, in the case of polymer fabrication, with the main body.

The present disclosure contemplates that a first set of the posts may be removable from the main body while a second set of the posts may be integrally formed to the main body.

The posts of the main body and/or the adapter body may extend through body components of a vehicle. Holes may be formed in the body components to receive the posts.

The adapter body may comprise one or more adapter holes. The adapter holes may function to receive one or more posts of the main body, fasteners, or both. The adapter holes may align with the post holes of the main body.

Posts of the main body residing in corresponding post holes and/or integrally formed with the main body may align with the adapter holes. Posts of the main body may extend through the adapter holes.

Posts of the main body may be removable therefrom. Post holes of the main body may align with the adapter holes. Fasteners may extend through the adapter holes of the adapter body and into the corresponding aligned holes of the main body.

The adapter holes may be located on an opposing side of the adapter body relative to one or more post holes of the adapter body. A first side of the adapter body may engage with the main body and a second side of the adapter body may engage with a body component of a vehicle.

The bracket assembly may comprise one or more fasteners. The fasteners may function to fasten the adapter body to the main body.

Where posts are removable from the main body, the fasteners may include pins, screws, bolts, the like, or any combination thereof. The fasteners may extend through the adapter body and into the main body. The fasteners may be introduced into the adapter body from a side thereof opposing the side of the adapter body that engages the main body.

Where the posts are integrally formed to the main body, the fasteners may include nuts, set screws, pins (e.g., cotter pin), the like, or any combination thereof. The fasteners may engage the posts of the main body. The adapter holes may comprise a first portion and a second portion, whereby the first and second portions are defined by at least one different dimension (e.g., length or width). A first portion may have a dimension (e.g., width) that corresponds to a dimension of a fastener (e.g., bolt) engaging both the adapter body and a main body. A second portion may have a dimension (e.g., width) that corresponds to a dimension of a fastener (e.g., nut) engaging a fastener or post.

The main body may comprise a light engagement member. The light engagement member may function to engage a light to the main body. The light engagement member may affix to a watermelon light, although any other light typically employed with vehicles are contemplated by the present teachings.

The light engagement member may be a clamp ring. The clamp ring may extend at least partially around a light. The clamp ring may comprise a first portion and a second portion. The second portion may be movable with respect to the first portion.

The light engagement portion may be any suitable mechanical and/or chemical engagement between the light and the bracket assembly. By way of example, the light may be engaged to the bracket assembly by one or more fasteners engaging both of the light and the bracket assembly. By way of another example, the light may be engaged to the bracket assembly by a chemical fastener, such as an epoxy.

The first portion may be integrally formed to the main body. The first portion may comprise a fastener through-hole that cooperates with the second portion.

The second portion may be removable from the first portion. In this regard, the light may be applied to the first portion and the second portion may be placed over the light and into engagement with the first portion.

The second portion may be hingedly engaged to the first portion. The hinge may be a mechanical hinge. The mechanical hinge may comprise two or more knuckles and a pin that extends through the knuckles. The hinge may be a deformable hinge. The deformable hinge may comprise material that deforms as the second portion is translated relative to the first portion. The deformable material may be elastically deformable.

The first portion and the second portion may be connected by one or more fasteners. The fasteners may extend through the second portion and into the first portion, or vice versa. The fasteners may extend through the hinged engagement of the first portion and the second portion. The fasteners may include screws, bolts, pins, the like, or any combination thereof.

The main body and/or the adapter body may comprise one or more wiring through-holes. The wiring through holes of the main body may be coaxial with the wiring through holes of the adapter body. In this regard, wires may extend through both the main body and the adapter body.

The wiring through-holes of the main body may cooperate with the wiring through-holes of the adapter body to provide for the passage of one or more wires. The wires may provide power, control signals, or both to the light.

The wiring through-hole of the main body and/or the adapter body may provide access to an underside of a vehicle body component. In this regard, wires may be fed underneath the vehicle body component and ultimately to an existing power line and/or a vehicle battery.

The wiring through-hole of the adapter body may cooperate with a post hole and/or a post of the adapter body to provide for the passage of one or more wires. The post may be hollow to provide passage of one or more wires. The post may be tubular.

The wiring through-hole of the main body may cooperate with a post and/or a post hole of the main body to provide for the passage of one or more wires. The post may be hollow to provide passage of one or more wires. The post may be tubular.

Figure 1:
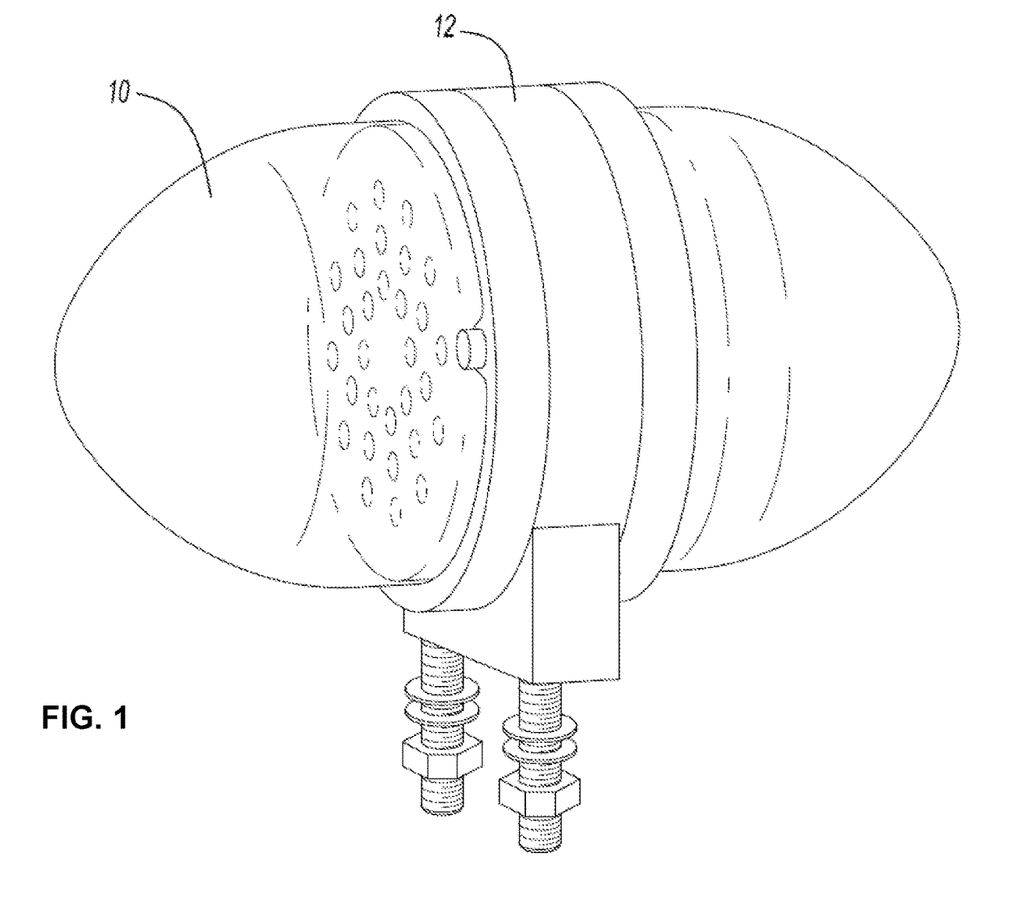
FIG. 1 is a perspective view of a light and a bracket assembly.

FIG. 1 illustrates a light 10 and a bracket assembly 12 therefor. The light 10 is a watermelon-style light. Other styles of lights may be employed with the bracket assembly 12 of the present teachings. The watermelon light is dual-faced. That is, lighting elements (e.g., light emitting diodes ("LED's")) are located on two opposing sides of the light 10.

Figure 2:
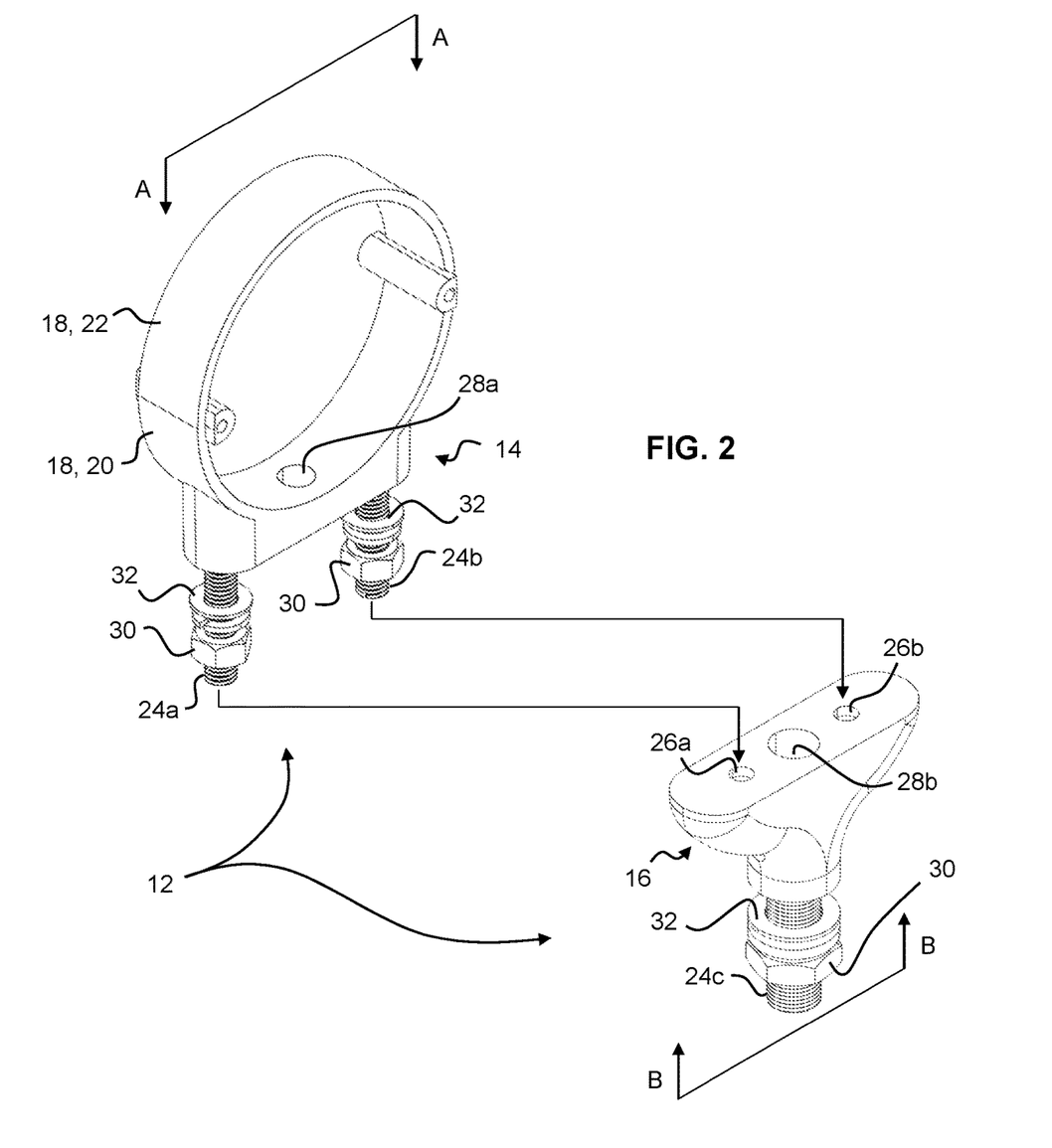
FIG. 2 is a perspective view of a bracket assembly.

FIG. 2 illustrates a bracket assembly 12 according to the present teachings. The bracket assembly 12 comprises a main body 14 and an adapter body 16.

The main body 14 comprises a clamp ring 18. The clamp ring 18 comprises a first portion 20 and a second portion 22. The first portion 20 is integrally formed (e.g., cast or molded) to the main body 14. The clamp ring 18 is adapted to secure the light 10 illustrated in FIG. 1. Other configurations to secure the light 10 may be appreciated by the present teachings.

Figure 4:
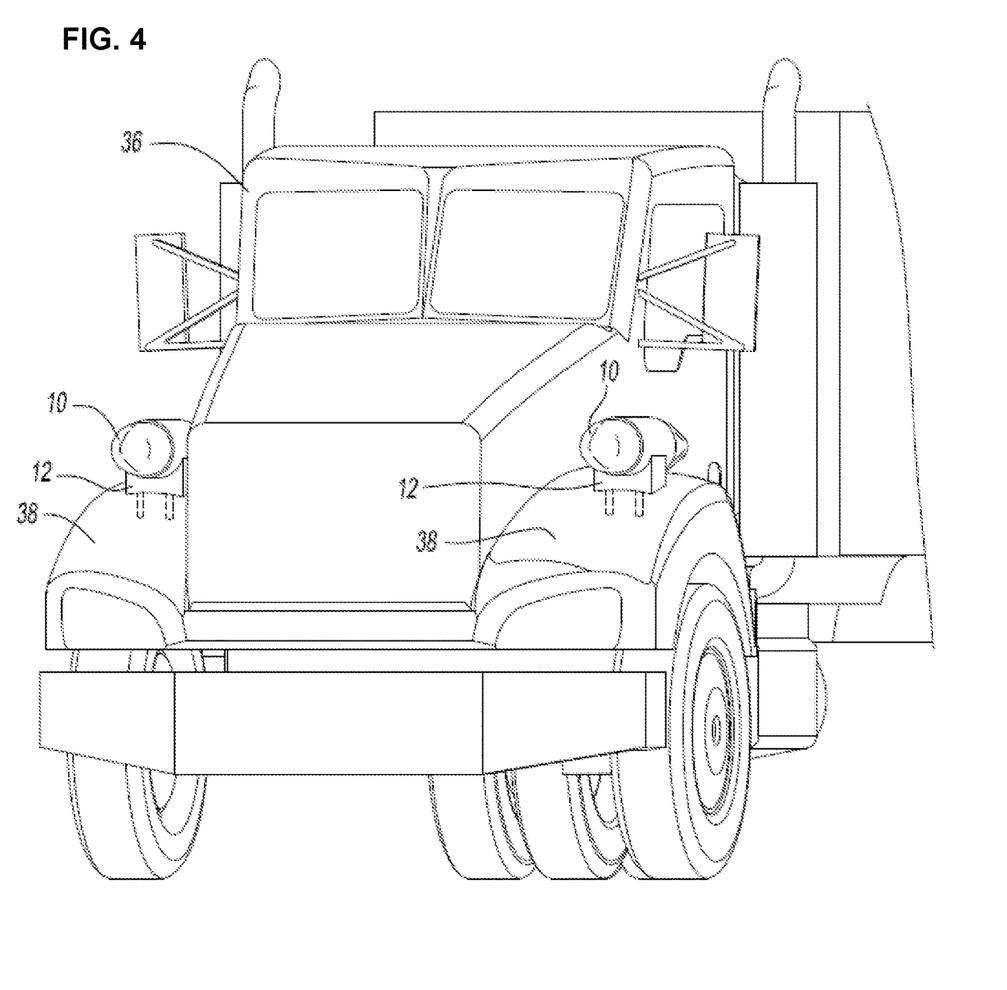
FIG. 4 is a perspective view of a vehicle with light brackets of the present disclosure installed thereon.

The main body 14 comprises two posts 24a, 24b. The two posts 24a, 24b are spaced from each other in correspondence to the spacing of holes on a vehicle body component (e.g., a fender), such as illustrated in FIG. 4, or the spacing of the adapter holes 26a, 26b, discussed below. The holes of the body component may be fabricated by an OEM and/or an end-user. The two posts 24a, 24b can be received by the holes on the vehicle body component, such as illustrated in FIG. 4, or the spacing of the adapter holes 26a, 26b.

The adapter body 16 comprises one post 24c. The post 24c is adapted to be received by a hole on a vehicle body component (e.g., a fender). The hole of the body component may be fabricated by an OEM or an end-user. The longitudinal extent of the post 24c is located co-axial with a central axis of the adapter body 16. It may be appreciated that depending on the quantity, size, placement, or any combination thereof of the holes on the vehicle body component, the adapter body 16 may or may not be installed with the main body 14.

The present disclosure contemplates that the main body 14 comprises one post while the adapter body 16 comprises two posts. The main body 14 and/or the adapter body 16 may comprise more than two posts. The quantity, size, and/or placement of the posts of either the main body 14 or the adapter body 16 corresponds to the quantity, size, and/or placement of holes disposed in body components of a vehicle.

The adapter body 16 comprises two adapter holes 26a, 26b alignable with and/or adapted to receive the two posts 24a, 24b of the main body 14.

In some aspects, the adapter body 16 is engaged to the main body 14 by the insertion of the posts 24a, 24b into the adapter holes 26a, 26b. A nut 30 and/or washer 32 may engage the posts 24a, 24b when they are located in the adapter holes 26a, 26b. The fastener can be located within the adapter holes 26a, 26b from a side of the adapter body 16 opposing the side of the adapter body 16 to which the main body 14 engages.

Figure 3A:
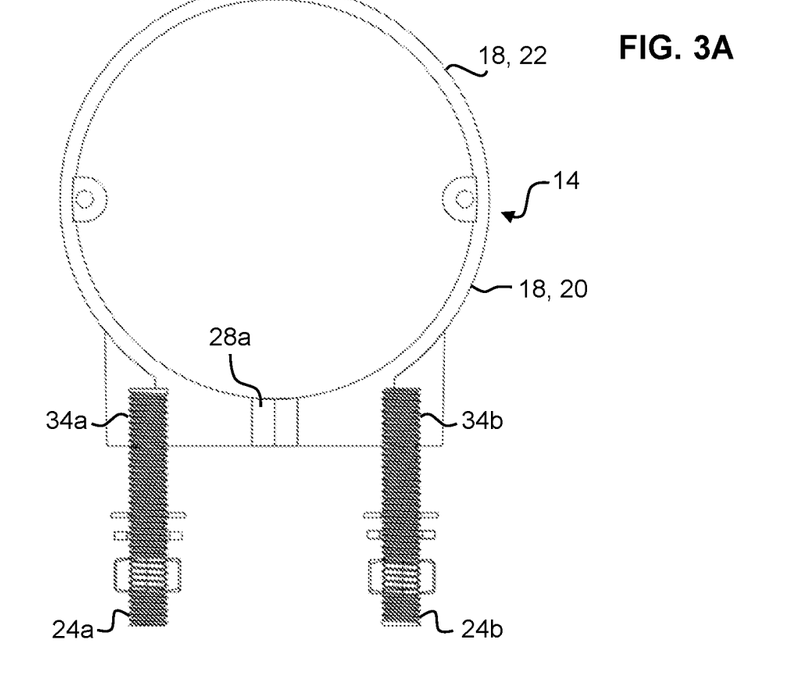
FIG. 3A is a sectional view of the main body, along the line A-A, of FIG. 2.

In some aspects, the posts 24a, 24b of the main body 14 are removable from the main body 14 and upon alignment of the post holes 34a, 34b, shown in FIG. 3A, with the adapter holes 26a, 26b, a fastener such as a threaded bolt can extend through the adapter holes 26a, 26b and into the post holes 34a, 34b.

The main body 14 comprises a wiring through-hole 28a and the adapter body 16 comprises a wiring through-hole 28b. The wiring through-holes 28a, 28b allow power wires, control wires, or any other types of wires typically employed with vehicle lights, to pass through the bracket assembly 12 and into the vehicle body component to which the bracket assembly 12 is engaged. Thus, the wires may be protected and non-visible from the exterior of the vehicle. The wiring through-holes 28a, 28b are alignable with each other. The wiring holes 28a, 28b are co-axial with a central axis of the main body 14 and the adapter body 16. The present disclosure contemplates that the wiring through-holes 28a, 28b can be offset from the central axis of the main body 14 and the adapter body 16.

Nuts 30 and/or washers 32 locate on an opposing side of the vehicle body component to tighten the bracket assembly 12 thereon.

FIG. 3A is a sectional view of a main body 14. The main body 14 comprises a clamp ring 18 with a first portion 20 and a second portion 22. The first portion 20 is integrally formed to the main body 14.

The main body 14 comprises two posts 24a, 24b. The two posts 24a, 24b can be spaced from each other in correspondence to the spacing of holes on a vehicle body component (e.g., a fender), such as illustrated in FIG. 4. Where the two posts 24a, 24b do not align with holes on a vehicle body component, the adapter body 16, depicted in FIG. 3B, can be employed.

The posts 24a, 24b are received by post holes 34a, 34b formed in the main body 14. The posts 24a, 24b are threaded. The post holes 34a, 34b are threaded in correspondence to the threading of the posts 24a, 24b.

Figure 3B:
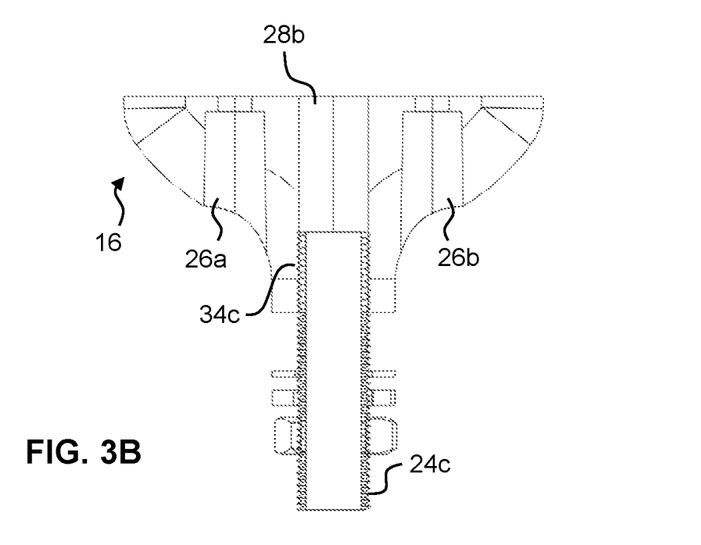
FIG. 3B is a sectional view of the adapter body, along the line B-B, of FIG. 2.

FIG. 3B is a sectional view of an adapter body 16. The adapter body 16 comprises one post 24c. The post 24c is adapted to be received by a hole on a vehicle body component (e.g., a fender).

The post 24c is received by a post hole 34c formed in the adapter body 16. The post 24c is threaded. The post hole 34c is threaded in correspondence to the threading of the post 24c.

The adapter body 16 comprises adapter holes 26a, 26b. The adapter holes 26a, 26b extend from a first side of the adapter body 16 to an opposing second side of the adapter body 16. A dimension (e.g., diameter) of the adapter holes 26a, 26b is greater on the first side relative to the adapter holes 26a, 26b on the second side. In this regard, nuts and/or washers may be located within the adapter holes 26a, 26b from the first side.

FIG. 4 illustrates a vehicle 36 with bracket assemblies 12 and lights 10 installed thereon. The bracket assemblies 12 are installed on body components 38, depicted as the driver side and passenger side fenders of the vehicle. The present disclosure contemplates that any vehicle body component may host the bracket assemblies 12.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Many embodiments as well as many applications besides the examples provided will be apparent to those of skill in the art upon reading the above description.

It is understood that the above description is intended to be illustrative and not restrictive. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. Other combinations are also possible as will be gleaned from the following claims, which are also hereby incorporated by reference into this written description.

The omission in the following claims of any aspect of subject matter that is disclosed herein is not a disclaimer of such subject matter, nor should it be regarded that the inventors did not consider such subject matter to be part of the disclosed inventive subject matter.

The disclosures of all articles and references, including patent applications and publications, are incorporated by reference for all purposes.

Plural elements can be provided by a single integrated element. Alternatively, a single element might be divided into separate plural elements. The disclosure of "a" or "one" to describe an element is not intended to foreclose additional elements.

While the terms first, second, third, etc., may be used herein to describe various elements, components, regions, layers, and/or sections, these elements, components, regions, layers, and/or sections should not be limited by these terms. These terms may be used to distinguish one element, component, region, layer, and/or section from another region, layer, and/or section. Terms such as "first," "second," and other numerical terms when used herein do not imply a sequence or order unless clearly indicated by the context. Thus, a first element, component, region, layer, and/or section discussed herein could be termed a second element, component, region, layer, and/or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value is, for example, from 1 to 90, from 20 to 80, or from 30 to 70, it is intended that intermediate range values such as 15 to 85, 22 to 68, or 43 to 51, are within the teachings of this specification. Likewise, individual intermediate values are also within the present teachings.

For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements or components herein also contemplates embodiments that consist essentially of the elements or components.

REFERENCE NUMERALS

10 Light
12 Bracket assembly
14 Main body
16 Adapter body
18 Clamp ring
20 First portion
22 Second portion
24a Post
24b Post
24c Post
26a Adapter holes
26b Adapter holes
28a Wiring through-hole
28b Wiring through-hole
30 Nut
32 Washer
34a Post hole
34b Post hole
34c Post hole
36 Vehicle
38 Body component

The invention claimed is:

1. A bracket assembly for a light mountable on a vehicle, the bracket assembly comprising:
a main body comprising:
a first post, and
a second post; and
an adapter body engageable to the main body and comprising:
a post,
a first adapter hole that receives the first post of the main body, and
a second adapter hole that receives the second post of the main body;
wherein the first and second posts of the main body and the post of the adapter body are oriented in a common direction.

2. The bracket assembly according to claim 1, wherein the first adapter hole of the adapter body aligns with a first post hole of the main body in which a portion of the first post of the main body resides; and wherein the second adapter hole of the adapter body aligns with a second post hole of the main body in which a portion of the second post of the main body resides.

3. The bracket assembly according to claim 2, wherein the first post of the main body and/or the second post of the main body are integrally formed to the main body.

4. The bracket assembly according to claim 2, wherein the first post of the main body and/or the second post of the main body are removable from the main body; wherein the first post of the main body and/or the second post of the main body include threading, at least on portions thereof that are received by the first post hole and/or the second post hole; and wherein the first post hole and/or the second post hole of the main body include threading corresponding to the threading of the first post of the main body and/or the threading of the second post of the main body, respectively.

5. The bracket assembly according to claim 4, wherein the bracket assembly further comprises:
a first fastener that extends through the first adapter hole and the first post hole of the main body; and/or
a second fastener that extends through the second adapter hole and the second post hole of the main body.

6. The bracket assembly according to claim 2, wherein the adapter body comprises a post hole in which a portion of the post of the adapter body resides; and wherein the post hole is located on an opposing side of the adapter body from the first and second adapter holes.

7. The bracket assembly according to claim 1, wherein the main body engages the light.

8. The bracket assembly according to claim 7, wherein the main body comprises a clamp ring that extends at least partially around the light; and wherein the clamp ring comprises a first portion and a second portion movable with respect to the first portion.

9. The bracket assembly according to claim 8, wherein the first portion is integrally formed to the main body.

10. The bracket assembly according to claim 9, wherein the first portion and the second portion are connectable by one or more fasteners.

11. The bracket assembly according to claim 1, wherein the first and second posts of the main body or the post of the adapter body extend through a body component of the vehicle.

12. The bracket assembly according to claim 1, wherein the main body and the adapter body each comprise a wiring through-hole; and wherein the wiring through-hole of the main body is coaxial with the wiring through-hole of the adapter body.

13. The bracket assembly according to claim 12, wherein the wiring through-hole of the adapter body cooperates with the post of the adapter body to provide for the passage of one or more wires; and wherein the post of the adapter body is tubular.

14. A bracket assembly for a light mountable on a vehicle, the bracket assembly comprising:
   a main body comprising:
      a first post,
      a first post hole in which a portion of the first post resides,
      a second post, and
      a second post hole in which a portion of the second post resides; and
   an adapter body engageable to the main body, and comprising:
      a post,
      a first adapter hole that receives the first post of the main body and/or aligns with the first post hole of the main body,
      a second adapter hole that receives the second post of the main body and/or aligns with the second post hole of the main body, and
      a post hole in which a portion of the post of the adapter body resides;
   wherein the post hole is located on an opposing side of the adapter body from the first and second adapter holes.

15. The bracket assembly according to claim 14, wherein the first post of the main body and/or the second post of the main body are removable from the main body.

16. The bracket assembly according to claim 14, wherein the bracket assembly further comprises:
   a first fastener that extends through the first adapter hole and the first post hole of the main body; and/or
   a second fastener that extends through the second adapter hole and the second post hole of the main body.

17. The bracket assembly according to claim 14, wherein the first and second posts of the main body and the post of the adapter body are oriented in a common direction.

18. The bracket assembly according to claim 14, wherein the main body and the adapter body each comprise a surface extending at least between the first and second post holes and the first and second adapter holes, respectively; and wherein the surfaces engage flush against each other.

19. A bracket assembly for a light mountable on a vehicle, the bracket assembly comprising:
   a main body comprising:
      a post; and
   an adapter body engageable to the main body, and comprising:
      a first post,
      a second post, and
      an adapter hole that receives the post of the main body;
   wherein the post of the main body and the first and second posts of the adapter body are oriented in a common direction.

20. The bracket assembly according to claim 19, wherein the adapter body comprises a first post hole and a second post hole in which a portion of each of the first and second posts of the adapter body respectively reside; and wherein the first and second post holes are located on an opposing side of the adapter body from the adapter hole.

* * * * *